(12) United States Patent
Sorek et al.

(10) Patent No.: US 8,494,306 B2
(45) Date of Patent: Jul. 23, 2013

(54) METHOD AND AN APPARATUS FOR CREATING A COMBINED IMAGE

(75) Inventors: Noam Sorek, Zikhron-Yaakov (IL); Eduard Oks, Bat-Yam (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1621 days.

(21) Appl. No.: 12/000,500

(22) Filed: Dec. 13, 2007

(65) Prior Publication Data
US 2009/0154821 A1 Jun. 18, 2009

(51) Int. Cl.
*G06K 9/36* (2006.01)

(52) U.S. Cl.
USPC .............................. 382/284; 345/629; 348/584

(58) Field of Classification Search
USPC .. 382/235, 236, 248, 250, 284; 345/629–641; 348/584–601
See application file for complete search history.

(56) References Cited

U.S. PATENT DOCUMENTS

| | | | |
|---|---|---|---|
| 6,100,927 A | 8/2000 | Ogino | |
| 6,987,530 B2 | 1/2006 | McConica | |
| 7,098,946 B1 * | 8/2006 | Koseki et al. ............... | 348/229.1 |
| 7,486,318 B2 * | 2/2009 | Ohki .............................. | 348/276 |
| 7,554,588 B2 * | 6/2009 | Yaffe ............................ | 348/297 |
| 7,916,185 B2 * | 3/2011 | Hatano et al. ............ | 348/231.99 |
| 8,103,134 B2 * | 1/2012 | Sorek et al. .................... | 382/313 |
| 2002/0154829 A1 * | 10/2002 | Tsukioka ..................... | 382/254 |
| 2004/0136603 A1 | 7/2004 | Vitsnudel et al. | |
| 2004/0145673 A1 | 7/2004 | Washisu | |
| 2007/0177035 A1 | 8/2007 | Hatano et al. | |
| 2009/0208062 A1 * | 8/2009 | Sorek et al. .................... | 382/107 |
| 2012/0057044 A1 * | 3/2012 | Shimizu ..................... | 348/223.1 |

FOREIGN PATENT DOCUMENTS

EP 1591959 11/2005

OTHER PUBLICATIONS

European Search Report Dated Mar. 19, 2009 From the European Patent Office Re.: Application No. 08253977.6.
Bruhn et al. "Combining the advantages of Local and Global Optic-flow Methods", L. Van Gool (Ed.), Pattern Recognition, Lecture Notes in Computer Science,vol. 2449, 2002.
Bruhn et al. "Real-Time Optic Flow Computation with Variational Methods",Computer Analysis of Images and Patterns. Lecture Notes in Computer Science, vol. 2756: 222-229, 2003. Abstract.
Lucas et al. "An Iterative Image Registration Technique With an Application to Stereo Vision", Proc 7th International Joined Conference on Artificial Intelligence (IJCAI): 674-679, 1981.

* cited by examiner

*Primary Examiner* — Aaron W Carter

(57) ABSTRACT

A method for generating a combined image that comprises, during capturing a sequence comprising a plurality of initial images, detecting a subset of the plurality of images having no substantial motion thereamong, combining data from the subset to produce a combined image, and outputting the combined image.

23 Claims, 4 Drawing Sheets

METHOD AND AN APPARATUS FOR CREATING A COMBINED IMAGE

FIELD AND BACKGROUND OF THE INVENTION

The present invention relates to a method and an apparatus for forming an image from a sequence of images and, more particularly, but not exclusively to a method and a mobile device for generating an image from a sequence of images using motion detection techniques.

In recent years, the demand for high performance compact digital imaging devices has increased. Such imaging devices convert an image of an intercepted scene into electronic signals by using an image sensor, such as a charge-coupled device (CCD) based sensor or a complementary metal-oxide semiconductor (CMOS) based sensor. In particular, the demand for high performance compact digital imaging devices, which are designed to be mounted in a compact device, such as a mobile phone, and have image sensors that have large numbers of pixels, for example more than two million pixels, is increasing. Such a demand is an outcome of the prevalence of mobile devices that incorporate digital cameras, such as laptops, webcams, mobile phones, personal digital assistants (PDAs) and the like.

One of the characteristics that determine the quality of an image is the exposure. In digital photography, exposure is the total amount of light allowed to fall on the image sensor during the process of taking an image. Such a total is a combination of an exposure period, which is the length of time during which light is allowed to fall on the image sensor, and the level of illumination received by the image sensor during the exposure period. If the image sensor is exposed for a longer period, the level of illumination can be reduced and vice versa.

As compact digital imaging devices are limited in size, they usually have relatively miniature lens apertures that admit only a limited amount of light and therefore provide a low level of illumination. As such, a longer exposure period is required in order to provide images with high quality and/or higher level of illumination.

However, long exposure periods may cause visual effects, such as a motion blur, that may degrade the quality of the image. As the camera integrates light coming from the scene for the entire length of the exposure time to generate a frame such as a bitmap image, a motion during this exposure time of moving objects may produce a noted blur along their trajectory. The noted blur may often result in distorted or unrecognizable object shapes. The faster the movement of the object, the stronger the blurring effect is found to be.

A number of system and devices have been developed to confront with the visual effects and/or the quality degradation caused by a low level of illumination. For example, U.S. Pat. No. 6,987,530, published on Jan. 13, 2003 discloses a method and apparatus for detecting and reducing motion blur caused by the movement between a camera and an object including calculation of first and second figures of merit associated with two substantially orthogonal directions and comparison of the figures of merit and adjustment of the magnitude of the amplitude of spatial frequencies of the image in response to the comparison.

Another example is described in U.S. Pat. No. 6,100,927, published on Aug. 8, 2000 that discloses a photographing apparatus, in which image information in a range wider than an ordinary range is converted into an electric signal by an image pickup and stored into an image memory, blurring is corrected by moving a reading-out area from the image memory in accordance with the blurring, and when the blurring correction is not performed, the image stored in the image memory is reduced to a predetermined size at a reduction ratio according to a zoom ratio by a zoom switch.

SUMMARY OF THE INVENTION

According to one aspect of the present invention there is provided a method for generating a combined image. The method comprises, while capturing a sequence comprising a plurality of initial images, detecting a subset of the plurality of images having no substantial motion thereamong, combining data from the subset to produce a combined image, and outputting the combined image.

Optionally, each the plurality of images has a first quality according to a first exposure, the combined image having a second quality according to a second exposure, the second quality being higher than the first quality.

Optionally, the combining comprises adding an image from the subset to an interim combined image having a quality, the adding being repeated as long as the adding increasing the quality.

Optionally, the combined image having a higher effective exposure time than the actual exposure time of each member of the subset.

Optionally, the method further comprises repeatedly performing a) and b), thereby generating a number of different combined images, the outputting comprising outputting the number of different combined images.

Optionally, the detecting comprises calculating a local motion of an object in at least one of the plurality of initial images.

Optionally, the detecting comprises calculating a global motion.

Optionally, the method further comprises storing the subset after detecting the first of the plurality of images having no substantial motion thereamong.

Optionally, the detecting comprises detecting substantial motionlessness in at least one of the plurality of initial images, further comprises identifying an image combining trigger before the combining, the subset comprising initial images captured between the substantial motionlessness and the identification.

Optionally, the method further comprises repeatedly performing c) as long as the effective exposure time of the combined image increases.

More optionally, the image combining trigger is a member of the group consisting of: a time when a self-timer command is received, a time when a effective exposure time of a combination of members of the subset is higher than a predefined threshold, and a time when a motion is detected in the sequence.

Optionally, the method further comprises encoding the plurality of images, the combining comprising combining encoded image data from the subset.

More optionally, the encoding comprises generating a plurality of joint photographic experts group (JPEG) images.

More optionally, for each the image the encoding comprises splitting the image into blocks and transforming each block using a discrete cosine transform (DCT), the encoded data being a plurality of coefficients from the plurality of JPEG images, further comprises quantizing and entropy encoding the combined image after the combining.

According to one aspect of the present invention there is provided an apparatus for generating a combined image. That comprises an image sensor adapted for capturing a sequence comprising a plurality of images, a motionlessness detection module, electronically connected to the image sensor, adapted for detecting a subset of the plurality of images having substantially no motion thereamong, and an image combining module, electronically connected to the motionlessness detection module, configured for combining data from the subset to produce a combined image.

Optionally, each the plurality of images having a first quality according to a first exposure, the combined image having a second quality according to a second exposure, the second quality being higher than the first quality.

More optionally, the combined image having a higher effective exposure time than the actual exposure time of each member of the subset.

More optionally, the motionlessness detection module is configured for identifying an image combining trigger, the subset comprising initial images captured between the substantial motionlessness and the identification.

More optionally, the apparatus further comprises a quality identification module configured for estimating an effective exposure time of a combination of the initial images and producing the image combining trigger according to the estimated effective exposure time.

More optionally, the apparatus further comprises a self-timer mechanism configured for generating the image combining trigger after a predefined delay from the detection.

More optionally, the apparatus further comprises a motion detection module configured for detecting a motion in the sequence and generating the image combining trigger according to the detected motion.

Optionally, the motionlessness detection module is adapted to detect a plurality of subsets in the plurality of images, each the subset having substantially no motion thereamong, the image combining module being configured for combining data from the subsets to produce the combined image.

Optionally, the motionlessness detection module is adapted to detect a plurality of subsets of the plurality of images, each the subset having substantially no motion thereamong, the image combining module being configured for generating a cluster of combined images, each the combined image being produced by combining data from respective the subset.

Optionally, the apparatus is a member of the group consisting of: a handheld imaging device, a cellular phone, a personal digital assistant (PDA), and a laptop.

According to one aspect of the present invention, there is provided an apparatus for generating a combined joint photographic experts group (JPEG) image. The apparatus comprises an image sensor adapted for capturing a sequence comprising a plurality of JPEG images, a motionlessness detection module, electronically connected to the image sensor, adapted to detect a subset of the plurality of JPEG images having substantially no motion thereamong, and an image combining module, electronically connected to the motionlessness detection module, configured for combining a plurality DCT coefficients from images of the subset to produce a combined image.

Optionally, the image combining module is configured for receiving an image combining trigger and limiting the combining in accordance with the received image combining trigger.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
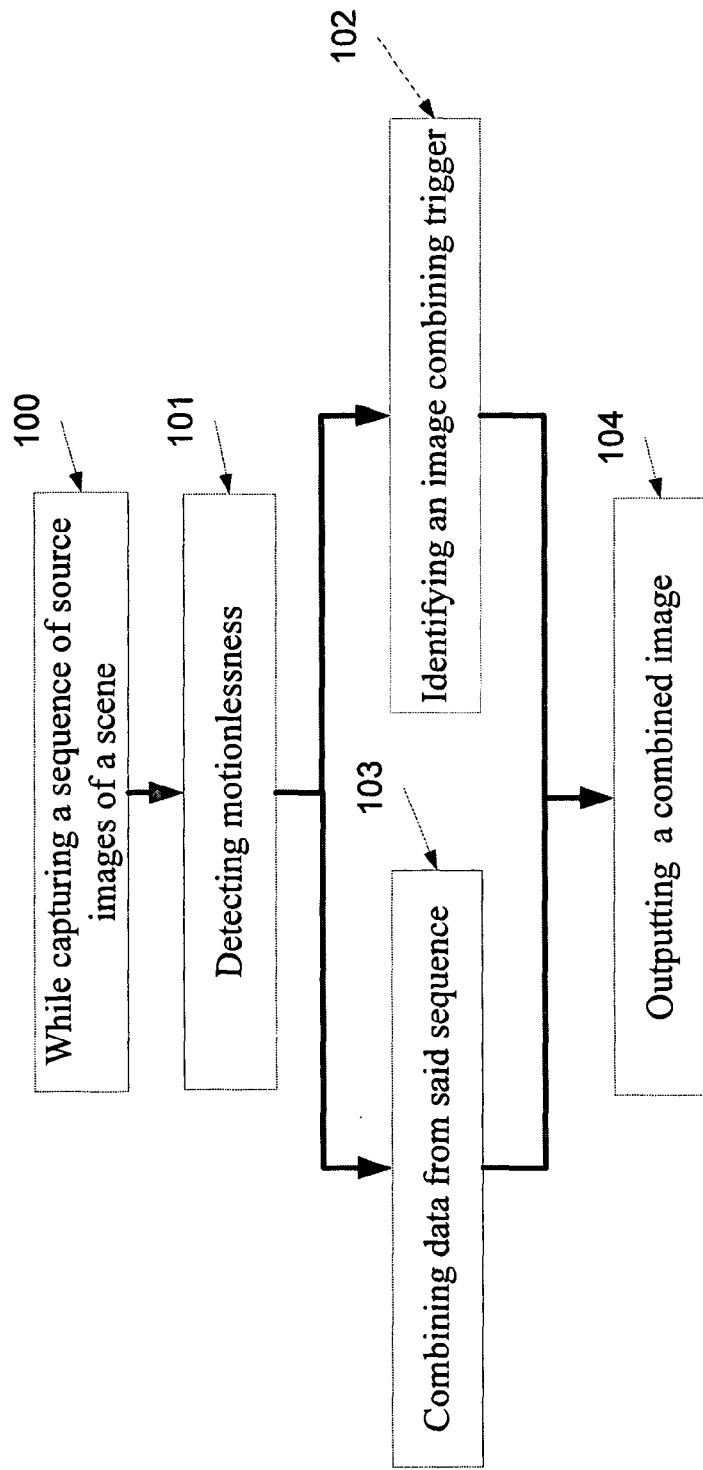
FIG. 1 is a schematic illustration of a method for creating a combined image from a number of digital images of a sequence, according to one embodiment of the present invention.

According to one aspect of the present invention there is provided an apparatus and a method for generating a combined image. The method comprises capturing a sequence of images, optionally from a video stream of a capturing element, such as an image sensor, and detecting substantial motionlessness in a subset of the sequence of images. As described below, the motionlessness may be detected by calculating the global motion between two or more images of the plurality of images or by calculating a local motion of one or more objects which are depicted in the plurality of images. Each image in the subset captures substantially the same motionlessness scene. The data in the subset is accumulated and optionally combined to a combined image between the identification of the motionlessness and an image combining trigger, such as the elapsing of a predefined delay. The image combining trigger, which may be static or dynamic trigger, defines the size of the subset and therefore defines the data that is combined to generate the combined image. The image combining trigger is selected before the combined image is finalized. Optionally, the period between the identification of the motionlessness and the identification and/or receiving of an image combining trigger is the time when the quality of the combined image is above a predefined threshold, when the quality of the combined images remains substantially constant, and when motion and/or substantial motion is detected in the sequence subset of the sequence of images.

Each one of the images has a certain quality that is determined according to the exposure that is defined by the properties of the capturing element. Briefly stated, the certain quality is determined, inter alia, according to a combination of an exposure period and the level of illumination of the capturing element.

As the subset comprises images captured after the motionlessness identification, each image of the subset captures substantially the same motionlessness scene. In such a manner, the combination of data from the images of the subset may be used for creating a combined image that has a higher quality than the quality of the images of the original sequence. In such an embodiment, the combined image may have less visual effects, such as motion blur and out-of-focus blur, which may degrade the quality of the image. Furthermore, such a combined image has the characteristics of an image with higher level of illumination than the level of illumination of the images of the original sequence. In such an embodiment, a sequence of images with a certain level of brightness that has been taken in low light conditions may be accumulated to form a brighter and clearer combined image. The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting.

Reference is now made to FIG. 1, which is a schematic illustration of a method for combining a plurality of images to produce a combined image, according to one embodiment of the present invention. FIG. 1 depicts a multi-stage method. During the first stage, as shown at 100, a sequence of digital images, which may be referred to as digital images, is captured, optionally after an initiation command has been received from a user, as further described below. Optionally, the sequence of digital images is a video stream that is captured using an image sensor, as described below.

In one embodiment of the present invention, the sequence of digital images is acquired from a preview mode of a certain camera, such as a video camera of a cellular phone or a personal digital assistant (PDA). Each one of the digital images in the sequence comprises a plurality of color pixels, each pixel comprising color information. Each pixel holds data bits that represent local brightness and color within the digital image, and the particular image may use any one of a number of different types of color coordinates.

The image sensor that is used to capture such images typically outputs a digital image in red-blue-green (RGB) color coordinates, YCbCr color coordinates, wherein Y is the Luma component and Cb and Cr are the blue and red Chroma components, or any other color space coordinates. The method may comprise a step of converting the color space coordinates of the digital image to YCbCr color coordinates.

In the present application, the level of an image quality is determined by the exposure that is used and/or should have been used for capturing an image. The exposure is the total amount of light allowed to fall on an image sensor that is used for capturing the image during the process of taking it. As described above, such a total is a combination of an exposure period, which is the length of time during which light is allowed to fall on the image sensor, and a value representing the level of illumination received by the image sensor during the exposure period.

Now, after a sequence of images is captured, a subset of images that do not depict substantial motion is identified. It should be noted that the subset may be identified in real time while or right after each image is captured or from a stored sequence. Optionally, the subset is identified as defined as sequential and discrete images captured between the identification of the motionlessness 101 and the identification and/or receiving of an image combining trigger 102, as further described below. During 101, motionlessness is detected in the received sequence of digital images. As described above, the sequence of digital images is a sequential stream of images, such as a video stream, that represent scenes in motion. In such an embodiment, motionlessness may be understood as one or more sequential digital images with no local and/or global motion and substantial motionlessness may be understood as one or more sequential digital images with local and/or global motion below a certain threshold.

The concepts of global motion and local motion are expressed with respect to a former image and a latter image of the sequential digital images. The global motion is an outcome of camera movements and/or changes in the zoom. The local motion is an outcome of an actual movement of an object in the scene captured in the sequential digital images. Briefly stated, a global motion is the change between the overall position of a group of objects in the former digital image and the overall position of the same group objects in the latter digital image. A local motion is the change in the position of one object in the former digital image in relation to its position in the latter digital image.

Optionally, a motion detection area is set in a frame that defines the boundaries of digital images of the sequence. In such an embodiment, a local motion is a local change between the motion detection area in the former and the latter digital images. A local change may be defined as a change above a certain threshold in the intensity of light of one or more pixels and/or clusters of pixels in the motion detection area.

Optionally, the global motion between two digital images is represented by a single vector, which may be referred to as a global motion vector. Optionally, the local motion of an object, which is depicted in the former and the latter digital images, is represented by a single vector, which may be referred to as a local motion vector.

Optionally, a global motion is a global change between the motion detection area in the former and the latter digital images. A global change may be defined as a change above a certain threshold in the intensity of light of most or all the pixels in the motion detection area.

Optionally, the global motion is detected in a global motion identification process that is based on a variant of the Lucas-Kanade global-motion algorithm, see D. Lucas et al, *An Iterative Image Registration Technique With an Application to Stereo Vision, Proc 7th International Joined Conference on Artificial Intelligence (IJCAI)*, Aug. 24-28, 1981, Vancouver, British Colombia, pp. 674-679, which is incorporated in its entirety by reference into the specification.

Optionally, the local motion is detected in a local motion identification process, such as an optic-flow algorithm, for example the optic-flow algorithm that has been published by A. Bruhn et al., see A. Bruhn et al. *Real-Time Optic-flow Computation with Variational Methods*. In N. Petkov, M. A. Westenberg (Eds.): *Computer Analysis of Images and Patterns. Lecture Notes in Computer Science*, Vol. 2756, Springer, Berlin, 222-229, 2003 and A. Bruhn et al., "*Combining the advantages of Local and Global Optic-flow Methods*, L. Van Gool (Ed.), *Pattern Recognition, Lecture Notes in Computer Science*, Vol. 2449, Springer, Berlin, which are incorporated in their entirety by reference into the specification.

Optionally, the vectors of the global and/or local motions are compared with one or more predefined vectors which each defines a motionlessness level that triggers the combining of data from the sequence of images to a combined image, as described below. In such an embodiment, a predefined vector that defines a substantial motionlessness level may be dynamically selected by the user of a capturing element that is used for taking the combined image. For example, the user may select one out of a number of possible motion detection thresholds, each associated with a different predefined vector that defines a different motionlessness level for triggering the generation of the combined image.

As described above, the method, which is depicted in FIG. 1, is designed for capturing an image of a certain scene. Usually, whenever a user wants to take a still image, she prefers taking an image that depicts a static scene. The identification of motionlessness is an indication that the scene that is depicted in the sequence of digital images does not include an object that moves faster than a predefined threshold and/or that the capturing element does not substantially tremble and/or zoom during the capturing process.

Such motionlessness detection may be substantially effective for improving the quality of images, which are captured by a compact digital imaging device, such as a miniature camera, a cellular phone, and a PDA. Compact digital imaging devices have a limited size and relatively miniature lens apertures that admit only limited amounts of light and therefore provide a low level of illumination. As such, a longer exposure period is required in order to provide images with high quality. However, long exposure periods may cause visual effects, such as a motion blur, that may degrade the quality of the image. As the camera integrates light coming from the scene for the entire length of the exposure time to generate a frame such as a bitmap image, a motion during this exposure time of moving objects may produce a noted blur along their trajectory. The noted blur may often result in distorted or unrecognizable object shapes. The faster the movement of the object, the stronger the blurring effect is found to be. As the generation of the combined image is triggered by the motionlessness detection, the digital images, which are used for generating the combined image, are relatively static and therefore have less noted blur.

Optionally, the digital images are combined to form a composite image of enhanced exposure relative to the exposure of any of the images of the original sequence. Optionally, each image that is added to the composite image is aligned to previous images that have been combined to form the composite image. Optionally, the captured images are combined by averaging or summing pixel-by-pixel to produce the composite image. The images may first be scaled or offset to a common mode before the combination occurs. The average may be weighted by statistical weights based on the mode and the number of images previously combined. Deviant pixels may be detected and excluded from the average using one of a number of known algorithms.

The images of the sequence may be captured in any size and/or dimension.

As shown at 102, an image combining trigger is identified. The image combining trigger defines an event that determines the termination of the integration of digital images which have been captured between the motionlessness detection and the identification of the image combining trigger, as described below.

During the following stage, as shown at 103, data from a subset of digital images, optionally sequential, which have been captured between the detection of motionlessness, as described in 101, and the integration time, are combined to form a combined image. The combining of the captured sequence allows the generation of a combined image with higher quality than the quality of each one of the captured digital images, without increasing the amount of light allowed to fall on the image sensor during the process of taking the digital images. An image with higher quality may be considered as an image with higher exposure rate.

In such an embodiment, the quality of the combined image is higher than the quality of each one of the digital images of the subset.

In particular, each one of the images of the captured sequence has a quality level that is determined according to the exposure that is set, in combination with the properties of the capturing element. It should be noted that the capturing element may work with different exposures. The quality of the captured images is determined according to a combination of an exposure period and the level of illumination of the capturing element, as described above.

Optionally, as long as an image combining trigger has not been identified, images of the aforementioned sequence are combined in real time, as shown at 103, while or right after they where taken. In such an embodiment, step 103 is repeatedly performed until an image combining trigger is detected. In particular, from the instance motionlessness is detected, images are combined. For example, in a sequence images, the first image is combined with the second image and an interim combined image that includes the combination of the first and second images is combined with a third image. The combination of the first, second, and third images is combined with the fourth image and so on and so forth.

In such a manner, there is no need to store all the images of the sequence as every new image that is captured in the sequence is combined in real time into the combined image.

As described above, the images, which are combined, are captured between the motionlessness detection and the identification of the image combining trigger. Optionally, a new image is added into the combined image only if motionlessness is detected between it and the prior image and/or the combined image. Optionally, such motionlessness is detected based on the calculation of a local and/or global motion vector between a source image and the prior image and/or the combined image. If the length of the vector is greater than a predefined threshold, the source image is ignored and the motionlessness between a sequential image and the prior image and/or the combined image is probed. If the calculated vector is below the predefined threshold, the source image is combined with the interim combined image and the motionlessness between a sequential image and an interim combined image that combines the source image is probed. In such an embodiment, the combined image may combine discrete images, which may be understood as non-sequential images.

As described above, the subset comprises sequential and/or discrete images captured between the motionlessness identification and the integration time. Each one of the images of the subset captures substantially the same motionless scene. In such a manner, the combination of data from the images of the subset may be used for creating a combined image that has a higher quality than the quality of the images of the original sequence. In such an embodiment, the combined image may have less visual effects, such as motion blur and out-of-focus blur, which may degrade the quality of the image than the images of the subset. Briefly stated, the combined image has an image quality of an image that has been captured in a slower exposure and with fewer visual defects than the image quality of the images of the subset that have been captured with a faster exposure. Such a combined image has the characteristics of an image with higher level of illumination than the level of illumination of the images of the original sequence. In such an embodiment, a sequence of images with a certain level of brightness that has been taken in low light conditions may be accumulated to form a brighter and clearer combined image.

The data in the subset is accumulated and optionally combined to a combined image between the identification of the motionlessness and the image combining trigger. Such an image combining trigger may be provided by a self timer mechanism, a change and/or a lack of change in the quality of the combined image, and/or any other dynamic and/or static event that is defined in advance, optionally as described below.

Now, as shown at 104, the combined image is outputted. As further described below, the combined image is outputted, stored and/or displayed and the process, which is depicted in FIG. 1, may stop or be repeated to allow the generation of a number of combined images, such as an array of images or a new sequence that depicts a static and/or a dynamic scene.

Figure 2:
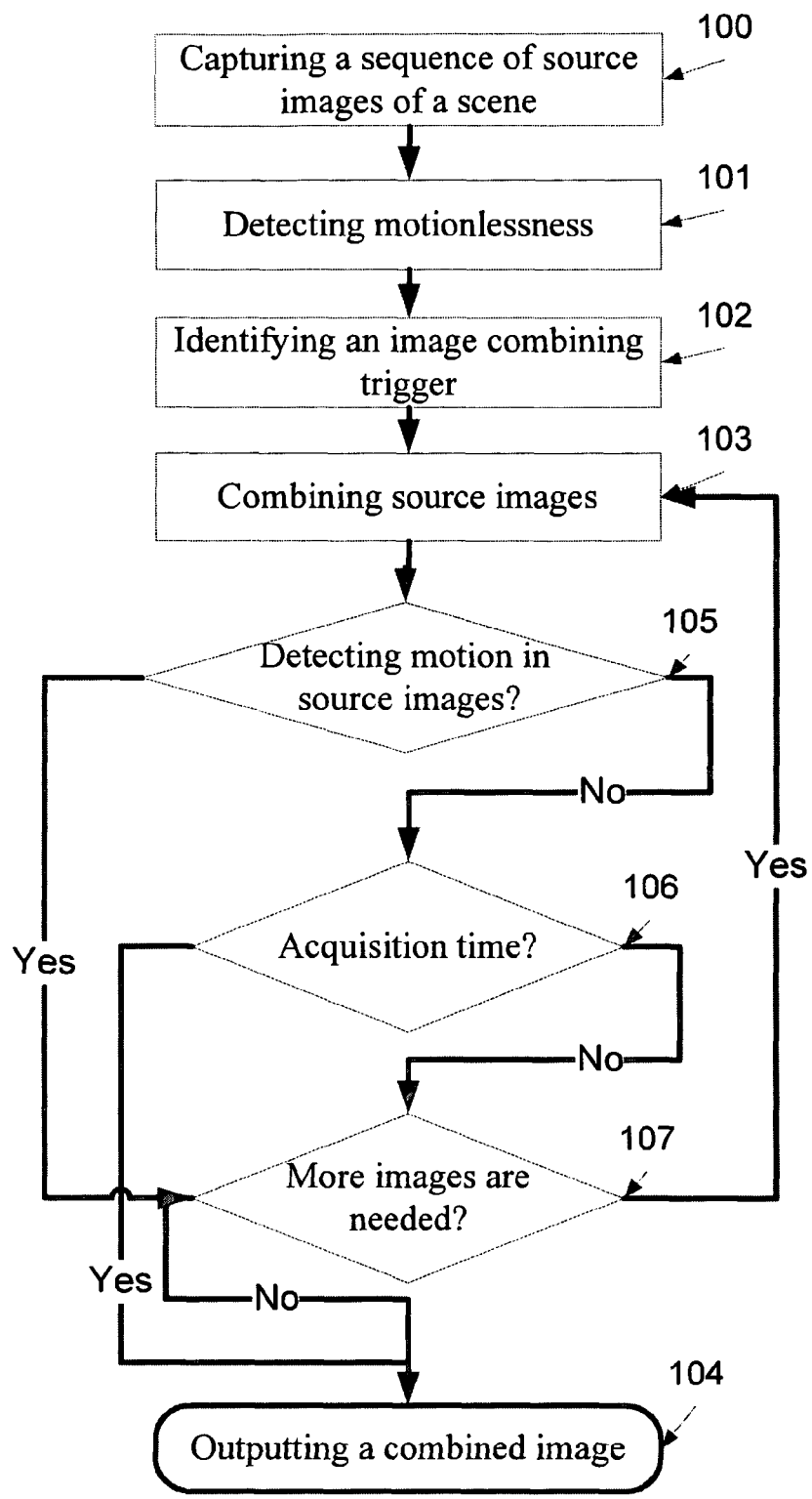
FIG. 2 is another schematic illustration of a method for creating a combined image from a number of digital images of a sequence, according to one embodiment of the present invention.

Reference is now made to FIG. 2, which is a schematic illustration of a method for creating a combined image of a certain scene with a high quality from a set of initially captured digital images, each having a lower quality, according to one embodiment of the present invention. Stages 100-104 are as depicted in FIG. 1, however FIG. 2 further depicts actions 107-106.

As described above, after motionlessness is detected in the received sequence of images, a sub-process of generating a combined image with high quality, as described above and depicted in 103, begins. Optionally, data from the received sequence is combined as long as no motion is detected in the sequence of digital images. As shown at 105, if motion is detected, the image accumulation stops, however if no motion is detected, the process continues.

Now, as shown at 106, if no motion has been detected, the image combining trigger that has been defined in 102 is probed. The image combining trigger may be the time when ceasing instructions are received from an delaying module. Optionally, the delaying module runs a self-timer mechanism that is used for defining a delay between the detection of motionlessness, as shown at 101, and the image combining trigger.

As shown at 107, if no motion has been detected and optionally no ceasing instructions have been received from the user or from an external module, the completeness of the combined image is probed. If more images are needed, as described below, more images are added to the subset of images which are used for generating the combined image, as shown at 103. However, if the combined image is complete, it is outputted, as shown at 104.

Figure 3:
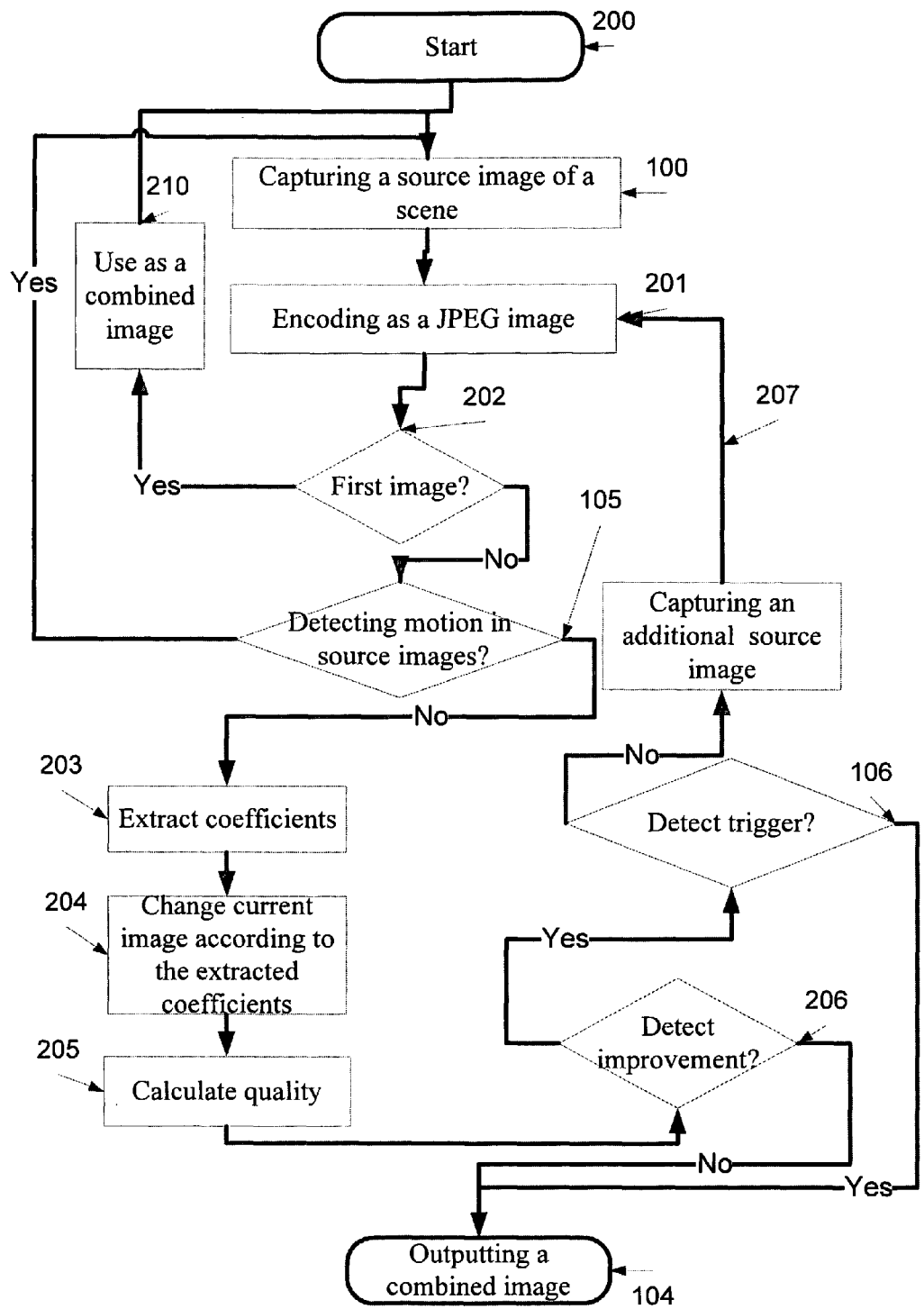
FIG. 3 is a schematic illustration of a method for creating an encoded image from a number of encoded digital images, according to one embodiment of the present invention.

Reference is now made to FIG. 3, which is a schematic illustration of a method for creating a combined image of a certain scene with a high quality from a set of digital images each having a lower quality, according to one embodiment of the present invention. Stage 100, 104, and 105-106 are as depicted in FIG. 2, however FIG. 3 further depicts actions 201-206.

FIG. 3 depicts an embodiment of the present invention wherein the images of the sequence of digital images handled and optionally stored as joint photographic experts group (JPEG) images, which are optionally defined in a JPEG standard that may be referred to as JPEG international standard organization (ISO)/international electro-technical commission (IEC) 10918-1 international telecommunication union (ITU)-T recommendation T.81, which is herein incorporated in its entirety by reference into the specification.

As commonly known, the key to the JPEG conversion is a discrete cosine transform (DCT) of N×N blocks. Each block is computed using the DCT, the results are quantized, and then entropy is coded.

Optionally, instead of accumulating or combining a sequence of digital images having a first quality to a combined image having a second quality, only partial information that can be deduced from the encoded N×N DCT blocks is accumulated. Though the computed N×N DCT blocks do not provide full information about the brightness and the color of respective sections of the related encoded digital image, they may be used for generating a combined image with higher quality. In such an embodiment, DCT coefficients, such as AC and DC coefficients, of digital images of the sequence are accumulated to form the combined image, as described above. Each coefficient represents the average color and/or the brightness level of a certain block in the N×N DCT blocks that comprise every JPEG image, optionally an 8×8 block. Therefore, processing DCT coefficients of a certain digital image requires substantially less computational complexity than processing the digital image itself. In such a manner, the computational complexity that is needed for generating a combined image from information that is included in the sequence of digital images is reduced As depicted in 100, when the process start 200 a source image, which is optionally a first image in a sequence of images, as described above, is captured. After a source image is received and/or captured, it is encoded and optionally stored as a JPEG image, as shown at 201. Optionally, the JPEG image is encoded according to the JPEG file interchange format (JFIF) standard that is incorporated herein by reference. Optionally, the encoding process consists of converting the colors in a digital image to YCbCr representation that includes a Luma component (Y) that represents brightness, and two Chroma components, which represent color. This step is skipped if the digital image is already represented in YCbCr color coordinates.

Optionally, the resolution of the Chroma data is reduced, usually by a factor 2. The reduction is based on the inability of a human eye to distinguish between fine color details and fine brightness details.

The JPEG is based on splitting the digital image into blocks of 8×8 pixels and transforming each of the Y, Cb, and Cr data of each block using a DCT. The result of the DCT is an 8×8 transform coefficient array in which the (0,0) element, which may be referred to as the top-left component, is a DC coefficient that has a zero-frequency and entries with increasing vertical and horizontal index values represent higher vertical and/or horizontal spatial frequencies. The DC coefficient represents the mean value of the waveform, optionally scaled according to the norm of the corresponding basis function of a frequency analysis. The mean value of the waveform may be understood as the brightness and/or the average color of the block.

The encoding of images from the sequence as JPEG images further includes quantizing the amplitudes of the frequency components of each transformed block and compressing the resulting data with entropy encoding that is based on a loss-less algorithm, optionally a variant of Huffman encoding. Optionally, the quantizing and compressing of the resulting data with entropy encoding are performed only during 104, after all the DCT coefficients have been calculated for all the blocks, as described below.

As shown at 210, if the captured image is the first image that is used for generating the combined image it is defined and used as a combined image for future calculations, as described below and, as shown at 100, an additional digital image is captured. If the digital image is not the first image, the process that is depicted in FIG. 3 proceeds in order to improve the quality of the combined image, as described below. Now, as shown at 105, motion is detected by probing the differences between the combined image and the source image. Optionally, the motion is detected by comparing between the DC coefficients of the source image and the DC coefficients of the combined image.

If no motion is detected, the DCT coefficients of the source image are extracted, as shown at 203, and used for adjusting the combined image, as shown at 204. Optionally, the DCT coefficients of the blocks in the combined image are updated according to the value of the extracted DCT coefficients. Optionally, each DCT coefficient in the combined image represents an average of all the respective DCT coefficients in the combined source images.

Then, as shown at 205, the quality of the adjusted combined image is calculated and optionally stored. If the quality of the adjusted combined image is higher than the quality of the combined image without the aforementioned adjustment, an additional digital image is captured and processed as described above in relation to 100-102, 200, 201, 202, 105, 106 and 203-206. However, if the quality of the adjusted combined image is not higher than the quality of the combined image without the aforementioned adjustment, the process is ended and the adjusted combined image is outputted, as shown at 104. Optionally, as described above, the image is quantized and compressed before it is outputted. Optionally, the outputted combined image is the combined image without the last aforementioned adjustment. In such a manner, the quality of the combined image is not reduced by the last digital image that did not improve its quality.

Figure 4:
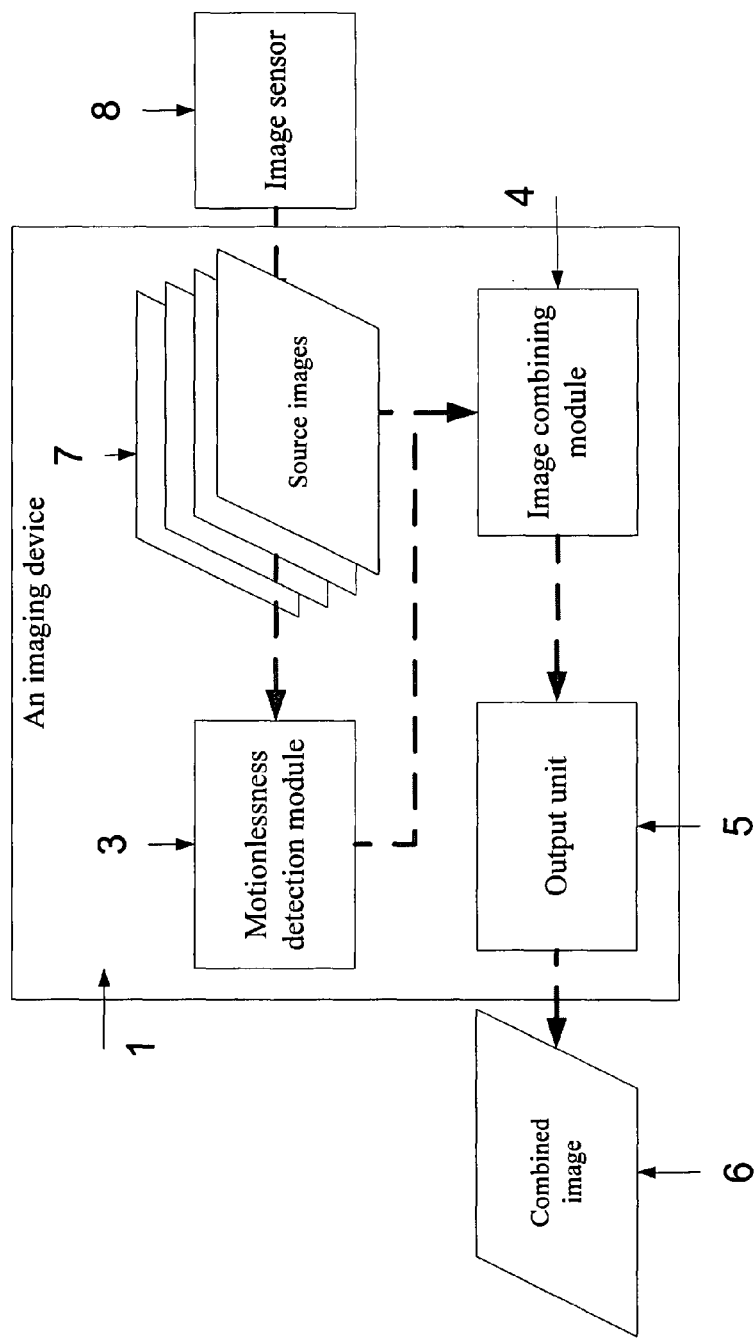
FIG. 4 is a schematic illustration of an imaging device for creating an image of a certain scene from a set of digital images, according to one embodiment of the present invention.

Reference is now made to FIG. 4, which is a schematic illustration of an imaging device 1 for generating a combined image 6 of a scene from a number of captured digital images 7 and for outputting, storing, and/or displaying the combined image. The combined image 6 has a quality higher than the quality of each one of the digital images 7. The imaging device 1, which is optionally a compact digital imaging device that is designed to be mounted in and/or be a part of a compact device, such as a mobile phone or a digital camera, is adapted to receive a sequence of digital images 7 from an image sensor 8, optionally via a designated image input module. The received sequence of digital images 7 comprises digital images that depict a certain scene and used as origins for the combined image 6. Preferably, the image sensor 8 is a CMOS based sensor and/or a CCD based sensor.

The sequence of digital images 7 is transferred to a motionlessness detection module 3 that detects motionlessness in the depicted scene, optionally as described above. In addition, the sequence of digital images 7 is transferred to an image combining module 4 that is designed for generating the combined image 7 according to data from a number of digital images of the sequence 7. In use, the motionlessness detection module 3 detects motionlessness and/or substantial motionlessness in the depicted scene and then triggers the combining of the digital images 7 by the image combining module. In such a manner, the combined digital images 7 depict a relatively static scene. The image combining module 4 combines the digital images 7 to generate the combined image 6. As described above, the combining is performed by generating an image that is defined by values; each value represents an average of respective values in the digital images 7. The combining may be understood as capturing one or more images from the digital images 7 and adjusting them according to data that is gathered from a number of images taken from the digital images 7. Optionally, the image combining module 4 continues to combine data from the digital images 7 as long as the quality of the combined image keeps improving or as long as it is not instructed otherwise by an delaying module or the like, as described above. The generated combined image 6 is forwarded to the output unit 5 that is optionally connected to a display and/or a storage device that is used for displaying and/or storing the combined image 6.

Optionally, the imagining device 1 integrates a man machine interface (MMI) that allows users to control its functioning. Optionally, the MMI is a minimized keyboard, a keypad, or a set of control buttons. Optionally, the MMI allows a user to initiate and/or to end the operation of the image combining module 4 by sending initiation and/or ending commands thereto. In such a manner, the user may force the generation of the combined image from any number of digital images. Optionally, the image combining module 4 continues to generate combined images and to forward them to the output unit 5 as long as ceasing instructions are not received from the MMI.

It is expected that during the life of this patent many relevant devices and systems will be developed and the scope of the terms herein, particularly of the terms image, image sensor, imaging device, and camera are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for generating a combined image, comprising:
while capturing a plurality of joint photographic experts group (JPEG) images, a) detecting a subset of said plurality of JPEG images having no substantial motion thereamong;
b) splitting each member of said subset to a plurality of blocks;
c) extracting a plurality of discrete cosine transform (DCT) coefficients from respective said plurality of blocks of each member of said subset;
d) combining a plurality of groups of said plurality of DCT coefficients to produce a combined image having a plurality of combined DCT coefficients, each said combined DCT coefficient is generated from another said group and represents at least one of an average color and an average brightness level of another of said plurality of blocks; and
e) outputting said combined image.

2. The method of claim 1, wherein each said plurality of images has a first exposure depended image quality according to a first exposure, said combined image having a second exposure depended image quality according to a second exposure, said second exposure depended image quality being higher than said first exposure depended image quality.

3. The method of claim 1, wherein said combining comprises adding a JPEG image from said subset to an interim combined image having an exposure depended image quality, said adding being repeated as long as said adding increasing said exposure depended image quality.

4. The method of claim 1, wherein said combined image having an exposure time more effective for improving an exposure depended image quality than the actual exposure time of each member of said subset.

5. The method of claim 1, further comprising repeatedly performing a)-d), thereby generating a number of different combined images, said outputting comprising outputting said number of different combined images.

6. The method of claim 1, wherein said detecting comprises calculating a local motion of an object in at least one of said plurality of JPEG images.

7. The method of claim 1, wherein said detecting comprises calculating a global motion.

8. The method of claim 1, further comprising storing said subset after detecting the first of said plurality of images having no substantial motion thereamong.

9. The method of claim 1, wherein said detecting comprises detecting a plurality of sequential digital images with local or global motion below a certain threshold in said plurality of JPEG images, further comprising identifying an image combining trigger before said combining, said subset comprising JPEG images captured between said plurality of sequential digital images and said identification.

10. The method of claim 1, further comprising repeatedly performing c) as long as the exposure time of said combined image increases.

11. The method of claim 9, wherein said image combining trigger is a member of the group consisting of: a time when a self-timer command is received, a time when an exposure time of a combination of members of said subset is higher than a predefined threshold, and a time when a motion is detected in said sequence.

12. The method of claim 1, further comprising quantizing and entropy encoding said combined image after said combining.

13. An apparatus for generating a combined image, comprising:
an image sensor adapted for capturing a plurality of joint photographic experts group (JPEG) images;
a motionlessness detection module, electronically connected to said image sensor, adapted for detecting a subset of said plurality of JPEG images having substantially no motion thereamong; and
an image combining module, electronically connected to said motionlessness detection module, configured for splitting each member of said subset to a plurality of blocks, extracting a plurality of discrete cosine transform (DCT) coefficients from respective said plurality of blocks of each member of said subset, and a plurality of groups of said plurality of DCT coefficients to produce a combined image having a plurality of combined DCT coefficients, each said combined DCT coefficient being generated from another said group and represents at least one of an average color and an average brightness level of another of said plurality of blocks.

14. The apparatus of claim 13, wherein each said plurality of JPEG images having a first exposure depended image quality according to a first exposure, said combined image having a second exposure depended image quality according to a second exposure, said second exposure depended image quality being higher than said first exposure depended image quality.

15. The apparatus of claim 14, wherein said combined image having a exposure time more effective for improving an exposure depended image quality than the actual exposure time of each member of said subset.

16. The apparatus of claim 13, wherein said motionlessness detection module is configured for identifying an image combining trigger, said subset comprising a plurality of JPEG images captured between a detection of a substantial motionlessness by analysis of a portion of said sequence and said image combining trigger.

17. The apparatus of claim 16, further comprising a quality identification module configured for estimating an exposure time having an improving effective on an exposure depended image quality of a combination of said JPEG images and producing said image combining trigger according to said estimated exposure time.

18. The apparatus of claim 16, further comprising a self-timer mechanism configured for generating said image combining trigger after a predefined delay from said detection.

19. The apparatus of claim 16, further comprising a motion detection module configured for detecting a motion in said sequence and generating said image combining trigger according to said detected motion.

20. The apparatus of claim 13, wherein said motionlessness detection module is adapted to detect a plurality of subsets in said plurality of JPEG images, each said subset having substantially no motion thereamong, said image combining module being configured for combining data from said subsets to produce said combined image.

21. The apparatus of claim 13, wherein said motionlessness detection module is adapted to detect a plurality of subsets of said plurality of images, each said subset having substantially no motion thereamong, said image combining module being configured for generating a cluster of combined images, each said combined image being produced by combining data from respective said subset.

22. The apparatus of claim 13, wherein the apparatus is a member of the group consisting of: a handheld imaging device, a cellular phone, a personal digital assistant (PDA), and a laptop.

23. The method of claim 1, wherein said combining comprises calculating, per each said block, an average of said plurality of respective DCT coefficients from each member of said subset to produce said combined image.

* * * * *